United States Patent
Feigel et al.

[11] Patent Number: 6,135,575
[45] Date of Patent: Oct. 24, 2000

[54] ELECTRONICALLY CONTROLLABLE BRAKE ACTUATING SYSTEM

[75] Inventors: Hans Jorg Feigel, Rosbach; Andreas Klein, Bad Homburg; Ulrich Neumann, Rossdorf; Lothar Schiel, Hofheim, all of Germany

[73] Assignee: ITT Automotive Europe, GmbH, Germany

[21] Appl. No.: 08/727,467

[22] PCT Filed: Apr. 18, 1995

[86] PCT No.: PCT/EP95/01445

§ 371 Date: Feb. 7, 1997

§ 102(e) Date: Feb. 7, 1997

[87] PCT Pub. No.: WO95/28307

PCT Pub. Date: Oct. 26, 1995

[30] Foreign Application Priority Data

Apr. 19, 1994 [DE] Germany .............................. 44 13 579

[51] Int. Cl.[7] ...................................................... B60T 8/40
[52] U.S. Cl. ..................................... 303/113.4; 303/114.1
[58] Field of Search .............................. 303/113.1, 113.4, 303/114.1, 115.2

[56] References Cited

U.S. PATENT DOCUMENTS

| | | | |
|---|---|---|---|
| 4,708,404 | 11/1987 | Seibert et al. | 303/114.1 |
| 4,730,877 | 3/1988 | Seibert et al. | 303/114.1 |
| 4,730,878 | 3/1988 | Reinartz et al. | 303/114.1 |
| 5,234,263 | 8/1993 | Haerr et al. | 303/115.2 |
| 5,312,172 | 5/1994 | Takeuchi | 303/113.4 |

Primary Examiner—Matthew C. Graham
Attorney, Agent, or Firm—Rader, Fishman & Grauer PLLC

[57] ABSTRACT

An electronically controllable brake actuation system for motor vehicles is proposed, with a master cylinder actuated by means of an actuating pedal, said cylinder with brake pressure transducers driven by an electronic control unit, to which wheel brakes of the motor vehicle are directly connected and which are connectable with the master cylinder by means of hydraulic linkages that can be locked by valve devices, with at least one sensor device to recognize the drivers desired deceleration and also with at least one simulator chamber cooperating with the master cylinder. In order to improve the function of a system of this kind, in particular for ASR control processes, it is proposed through this invention that the valve devices be designed as electromagnetic valves driven by the electronic control unit and that the pressure-volume characteristic of the simulator chamber is independent of that of the wheel brakes.

12 Claims, 6 Drawing Sheets

ELECTRONICALLY CONTROLLABLE BRAKE ACTUATING SYSTEM

TECHNICAL FIELD

This invention relates to automotive brake systems and more particularly relates to an electronically controllable, antilock brake actuating system for motor vehicles.

BACKGROUND OF THE INVENTION

A brake actuation system of this kind is known, for example, from DE 4,102,497 C1. In this brake actuation system, the buffer memories that can be used for pedal path simulation, which are positioned separately from the master cylinder, are located relatively far from the brake pedal, so that in a control event, no optimum pedal feel can be obtained. Considered to be less favorable is the space requirement associated with the installation of the buffer memory and also the relatively poor ventilation of the buffer memories.

In addition, from DE-OS 4,229,041 A1 an electronically controllable, fail-safe brake actuating system is known in which both the master cylinder and also the electrically controllable brake pressure transducer equipped with a separate hydraulic fluid supply tank can be connected by means of an electromagnetically actuated 3/2-way valve with the wheel brakes. In a first switch setting of the 3/2-way valve, a hydraulic linkage exists between the master cylinder and/or the pressure transducer and the wheel brake, whereas the connection between the pressure transducer and/or the master cylinder and the wheel brake is blocked. In a second switch setting, the 3/2-way valve establishes a hydraulic connection between the pressure transducer and/or the master cylinder and the wheel brake, whereas the connection between the master cylinder and/or the pressure transducer and the wheel brake is blocked. Due to the stated measures, in intact systems the driver is separated from the wheel brake and feels a hard pedal. Since the brake pressure transducers are equipped with separate hydraulic fluid supply tanks, they must be separated from the wheel brake in case of a power failure, so that complicated valves have to be used.

DE-OS 3,424,915 discloses blocking of the hydraulic linkages between the brake pressure transducers and the master cylinder by means of holes (blow holes) drilled in the hydraulic cylinders of the brake pressure transducers, the holes being passed therefor over by sealing sleeves located on their piston upon actuation of the brake pressure transducers.

However, the known brake actuating systems are less well suited for use in antilock brake systems. For example, the locking, hydraulic linkages do not permit the relief of the hydraulic pressure prevailing in the wheel brake down to near zero, in an ABS control event since during the necessary complete restoring motion of the brake pressure transducer piston, the drill hole mentioned above would be released to which the relatively high pressure created by the driver is applied.

Also less advantageous for an ABS control are the chambers formed in the hydraulic cylinders of the brake pressure transducers; the volume of hydraulic fluid displaced by the driver of the vehicle is introduced into said chambers in order to maintain the usual pedal feel for the driver upon actuation. The drive units of the brake pressure transducers must in every case actively ensure the restoring motion of the pressure transducer pistons, so that large costs are required for a four-quadrant control electronics system and also a design for maximum actuating force is necessary. In addition, an undamped pedal restoration takes place against the driver's foot.

Finally, the direct actuation of the valve device formed by the combination of drill hole (blow hole) and sealing sleeve takes place in actuality by means of the electric drive due to the non-negligible mass inertia at a time delay, which, for its part, results in an inflow of a considerable volume of hydraulic fluid, so that a pressure relief to values near zero bar is not possible. This adversely affects particular control processes at lower values.

Therefore it is the purpose of the present invention to improve an electronically controllable brake actuating system of the kind described above in such a manner that in particular the disadvantages stated in an ABS control will be essentially avoided. At the same time, an improvement in pedal feel is to be achieved with simultaneous reduction in the total expense.

This problem is solved according to this invention in that the simulator chamber in the tandem main cylinder is constructed as a constituent of one of its pressure areas, with the simulator piston running in the secondary piston and limiting a hydraulic chamber which is connected to a nonpressurized compressive agent supply tank cooperating with the tandem main cylinder. Due to this activity, a particularly compact design of the invented brake actuation system is achieved.

In a favorable refinement of the object of the invention, the simulator piston can move upon actuation of the tandem main cylinder opposite the actuation direction and cooperates with a stop formed on or in one of the master cylinder pistons. In this case it is particularly favorable if the simulator spring is braced against the master cylinder housing and features a progressive force-path line.

Due to the bracing against the tandem master cylinder housing, the prerequisite is created for a large part of the stroke work stored in the simulator spring to be used again for the brake pressure buildup, when the simulator piston strikes against the master cylinder piston and the simulator spring is relaxed. This working range is intended exclusively for the hydraulic function (failure of the electric system) in order to satisfy the legal requirements for large vehicles.

In another favorable refinement of the object of the invention, the connection between the simulator chamber and the master cylinder can be blocked by means of a second valve device, or the simulator chamber is disconnected from the master cylinder in the nonactuated state of the system. This means that in a failure of the brake pressure transducer, the entire volume of the master cylinder can be used for pressure build up in the wheel brakes, or that the increase in volume of the simulator chamber can be adapted, if necessary, to that of an ordinary brake system.

One aspect of the invention that lends itself to low cost production is that the electromagnetic valves and the second valve devices can be actuated jointly, in particular, that they are designed as 3/2-way valves.

A complete drainage of the simulator chamber, especially in the case of a defective second valve device, is ensured according to an additional property of the invention in that the second valve device or the 3/2-way valves are connected in parallel to the nonreturn valves opening to the master cylinder.

An additional design that lends itself to low cost production, in which a good tightness of the 3/2-way valves in both switch settings (to the simulator chamber and also to the wheel brake) is ensured, consists in designing the 3/2-way valves as double seat valves.

A controlled driving, especially with regard to the threshold values and/or gradients, of the valve devices, which are released only after a fault check, is achieved in an additional embodiment wherein the valve devices can be driven directly by means of the output signals of the sensor unit supplied to the electronic control unit.

A recognition of the driver's deceleration requirements determinable without friction or locking is thus made possible in that the sensor device is formed by a force sensor which determines the actuating force acting on the brake actuating pedal.

A dependable design of the invented brake actuating system manufactured at low cost and in which the sensor device is formed by at least one pressure sensor connected to the master cylinder, consists in designing the pressure sensor as a constituent of the electronic control unit. Since no cable or plug-in connections are used outside of the electronic control unit, the result is a simplification in assembly effort.

A low-friction conversion of a rotational motion into a linear motion, in particular in a favorable refinement of the invention, in which the brake pressure transducers are formed by hydraulic cylinders whose pistons are actuated by means of electrically driven d-c motors, takes place by accomplishing the actuation by means of a ball screw connected between piston and d-c motor. In this case it is useful if the spindle of the ball screw and the shaft of the d-c motor form a structural unit or if the shaft of the d-c motor is of hollow design and the spindle holds the ball screw. Due to these measures, a simple assembly of the brake pressure transducer and/or a simple design of the spindle is attained. In addition, the brake pressure transducers feature a short structural shape.

In order to keep the thermal and electrical or power stress on the d-c motor actuating the brake pressure transducer as small as possible, an additional favorable design of the object of the invention provides that features are provided which allow a reduction in the current supplied to the d-c motor with simultaneous prevention of a decrease in the pressure registered in the wheel brake. Thus the desired brake action is retained, even though the d-c motor cools. The aforementioned features can be formed either by valves located between the wheel brake and the brake pressure transducer or by a friction brake which cooperates with the ball screw of the brake pressure transducer. In the latter design, only a small brake torque is needed.

In this case it is particularly advantageous if the friction brake is electrically controlled. Compared to permanent acting friction brakes, no losses occur during normal operation.

In another favorable refinement of the object of the invention, the d-c motor is reversible. Due to this action, high rates of pressure reduction are also attained even at low brake pressures. In addition, a design of this kind is characterized by low susceptibility to friction effects in a pressure drop and also by a reduced axial length.

In a highly dynamic design in which no problems occur with power demand peaks and in which the brake pressure transducers are formed by hydraulic cylinders whose pistons can be actuated by means of valve-controlled, pneumatic or hydraulically driven linear drives, good control with reduction of the necessary sensor expense is attained by designing the valves used for the control as pressure-regulating valves. The hydraulic control of the linear drive occurs in particular and preferably by means of a single pressure source to which additional hydraulic loads can be attached. Alternatively, the linear drives can be controlled by means of pneumatic high pressure. A design of this kind makes use of the good storability of air and is characterized primarily by a small installation space requirement.

An improvement in controllability is achieved in one refinement of the invention by providing features to ascertain the position of the pressure transducer piston and/or of the angular position of the rotors of the d-c motors.

A particularly good controllability, especially in the lower pressure range, is achieved in an additional design of the object of the invention by integrating the valves used for the control into a position control circuit which processes the output signals from the aforementioned features.

An additional improvement in controllability is achieved according to an additional property of the invention, by providing means for sensing the pressure applied by the pressure transducers, with the valves used for the control being integrated into a pressure control circuit that processes the output signals from the aforementioned means.

DETAILED DESCRIPTION OF THE PREFERRED EMBODIMENT

Figure 1:
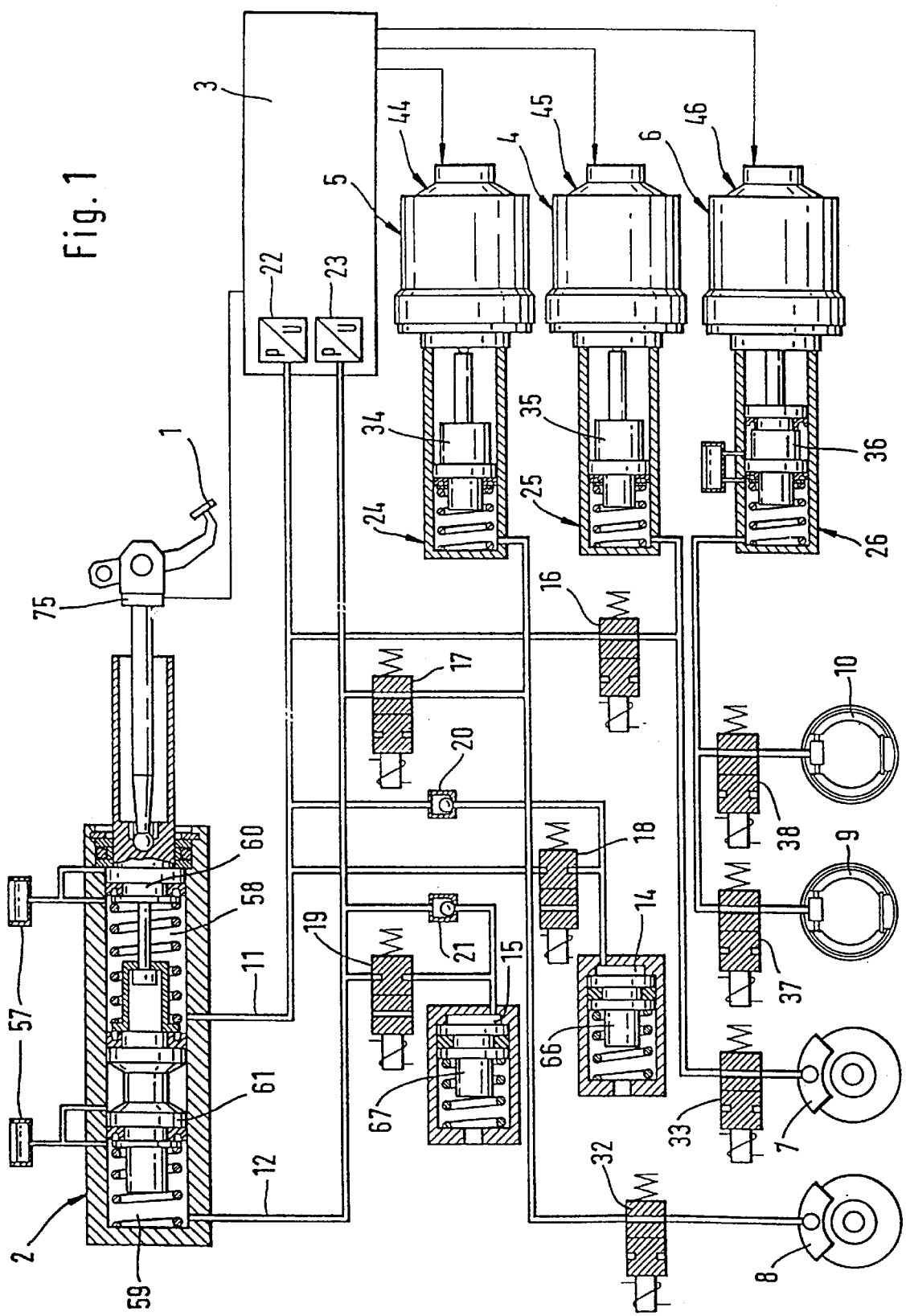
FIG. 1 is a circuit diagram of a first embodiment of the brake actuating system according to this invention.

The electronically controllable brake actuating system according to the invention and illustrated in the figures is intended for a motor vehicle with front wheel drive. It consists of a two-circuit master cylinder and/or tandem main cylinder 2 actuated by means of an actuating pedal 1. Cylinder 2 features pressure areas 58, 59 separated from each other and bounded by two pistons 60, 61, and connected to a unpressurized tank 57 for a hydraulic fluid supply. The first pressure area (primary pressure area) 58 is connected by means of a blockable first hydraulic line 11, to an electrically controlled brake pressure transducer 4 to which one of the hydraulic wheel brakes, namely brake 7 associated with the front axle is attached. The blocking of the line 11 takes place by means of a first electromagnetic valve 16, while in the line section between the brake pressure transducer 4 and the wheel brake 7, there is a disconnect valve 33 also actuated electromagnetically.

In addition, there is a first simulator chamber 14 bounded by a spring-loaded piston 66 connected to the first pressure area 58 by way of a parallel circuit of an electromagnetically activated 2/2-way value 18 and a nonreturn valve 20 opened to the master cylinder 2. The second pressure area (secondary pressure area) 59 is connected by way of a second hydraulic line 12 that can be blocked by means of a second electromagnetic valve 17 to a second electrically driven brake pressure transducer 5, to which the other hydraulic wheel brake 8 associated with the front axle is attached. Upstream of which an electromagnetically actuated disconnect valve 32 is connected to the inlet. In addition, there is a second simulator chamber 15 bounded by a second, spring-loaded piston 67 connected to the second pressure area 59 by way of a parallel circuit of a second electromagnetically activated 2/2-way valve 19 and a second nonreturn valve 21 opened into the master cylinder 2. By means of additional disconnect valves 37, 38, both hydraulic wheel brakes 9, 10 associated with the rear axle, for example, are connected to a third brake pressure transducer 6. All three brake pressure transducers 4, 5,6 have the same design and each consists of a hydraulic cylinder 24, 25, 26, in which there is one sliding piston 34, 35, 36, each of which can be driven by a preferably reversing d-c motor 44, 45, 46. The common driving of the d-c motors 44, 45, 46 and also of the electromagnetic valves is handled by an electronic control unit 3. As its input signals it uses the output signals from a brake light switch 75 cooperating with the actuating pedal 1, and also the output signals from two pressure sensors 22, 23 which are connected to the pressure areas 58, 59 of the tandem main cylinder 2 and which allow a recognition of the driver's desired deceleration. In this case it is particularly favorable if the pressure sensors 22, 23 are designed as constituents of the electronic control unit 3. However, to detect the driver's desired deceleration, different features can be used, for example, a force sensor sensing the actuating force on the actuating pedal 1.

In addition, wheel sensors 77, 78, 79, 80 (FIG. 3) are allocated to the individual wheels (not shown) in FIG. 1. The output signals from these sensors corresponding to the driving speed are sent as additional input parameters to the electronic control unit 3.

Figure 2:
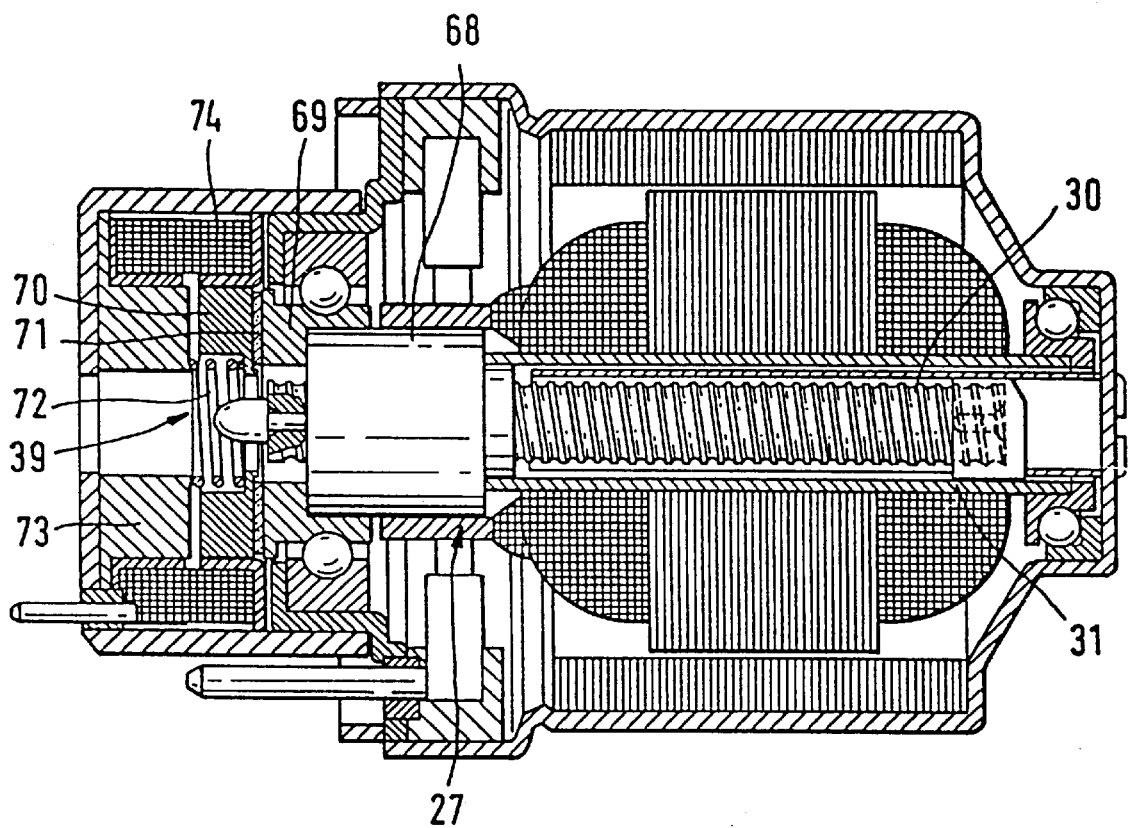
FIG. 2 is an axial cross section of the d-c motor driving the brake pressure transducer according to FIG. 1.

As is indicated in particular in FIG. 2, the actuation of the piston 34, 35, 36 of the brake pressure transducer 4, 5, 6 takes place by means of a ball screw or spindle-nut pinion 27, whose spindle 30 is positioned torsion-free in a preferably hollow shaft 31 of the d-c motor 44, 45, 46. The spindle nut 68 is linked so as to transfer force to the piston 34, 35, 36 and supports a pressure plate 69 which is engaged in a torsion-free magnetic armature 70 provided with a friction coating 71 and prestressed by means of a tension spring 72 in the direction of the pressure plate 69. The magnetic armature 70 cooperates with a magnetic core 73 and also with a coil 74 so that upon activation of the resultant electromagnet, the magnetic armature 70 is attracted by the magnetic core 73 against the action of the tension spring 72 so that it disengages from the pressure plate 69. The aforementioned parts 69 to 74 form a friction brake 39, which makes it possible to reduce the current being supplied to the d-c motor 44, 45, 46 while simultaneously preventing a decrease in the hydraulic pressure prevailing in the wheel brake 7, 8, 9, 10. The valves 32, 33, 37, 38 located between the brake pressure transducers 4, 5, 6 and the individual wheel brakes 7 to 10 can also be used for the same purpose. Through the use of the valves 37, 38 allocated to the wheel brakes 9, 10, moreover, a multiplex pressure control is made possible for the rear axle.

Figure 3:
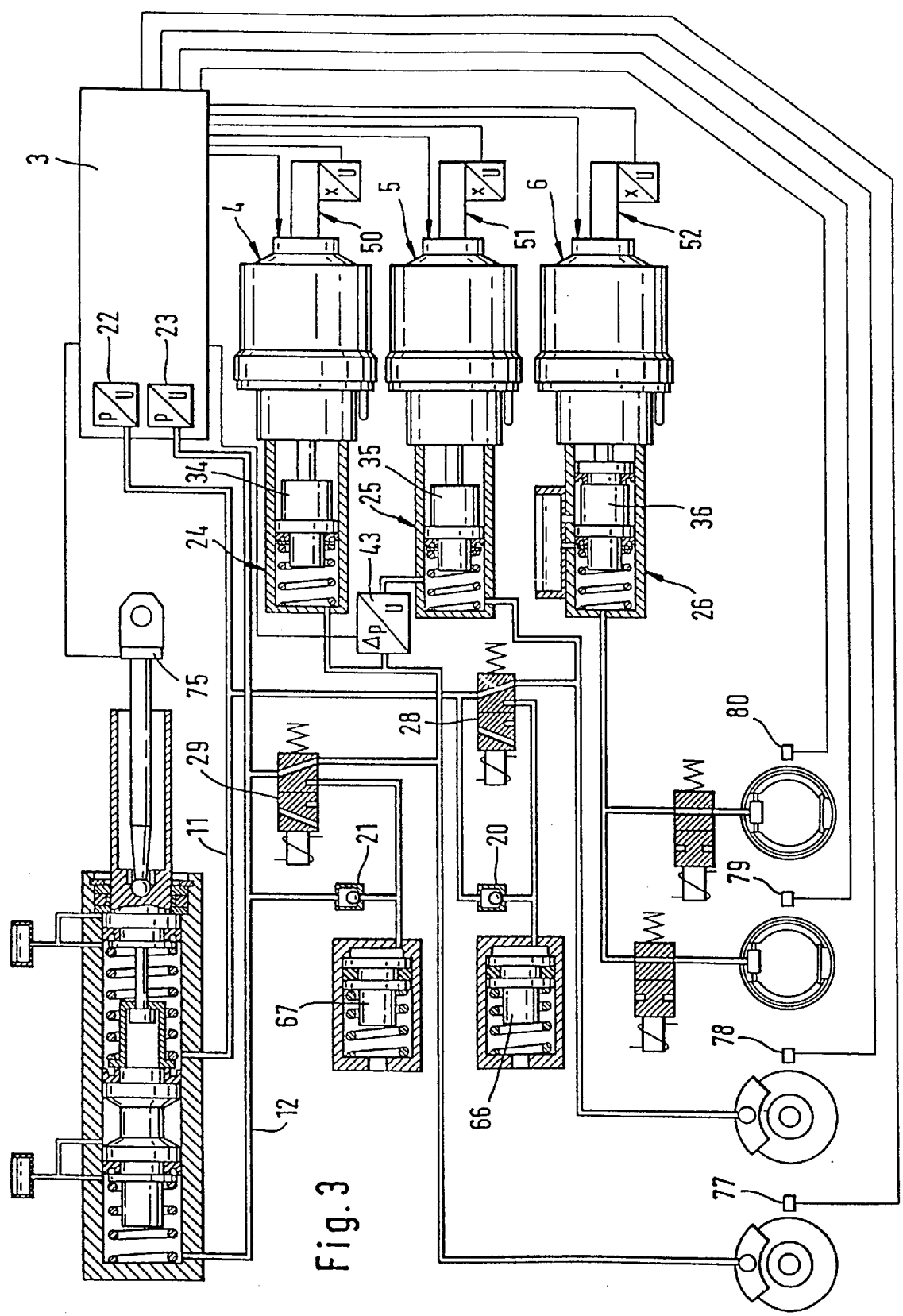
FIG. 3 is a circuit diagram of a second embodiment of the brake actuating system according to this invention.

In the second embodiment shown in FIG. 3, electromagnetically actuated 3/2-way valves 28, 29 are inserted into the hydraulic lines; these valves functionally replace the valves 16, 18 or 17, 19, respectively, used in the design illustrated in FIG. 1 and can be designed preferably as double seat valves. A pressure differential-voltage converter 43 is connected to the pressure areas (not indicated in detail) of the hydraulic cylinders 24, 25. The output signals of the voltage converter are sent to the electronic control unit 3 as additional input quantities. In addition, in the second design, means are provided which enable an indirect determination of the position of the brake pressure transducer pistons 34, 35, 36 and which are designed, in the present example, by path sensors 50, 51, 52 which sense the translational motion of the spindle 30 (see FIG. 2). However, it is also possible, for the purpose of acquiring the piston position, to provide features which ascertain the angular position of the rotors of the d-c motors 44, 45, 46.

Figure 4:
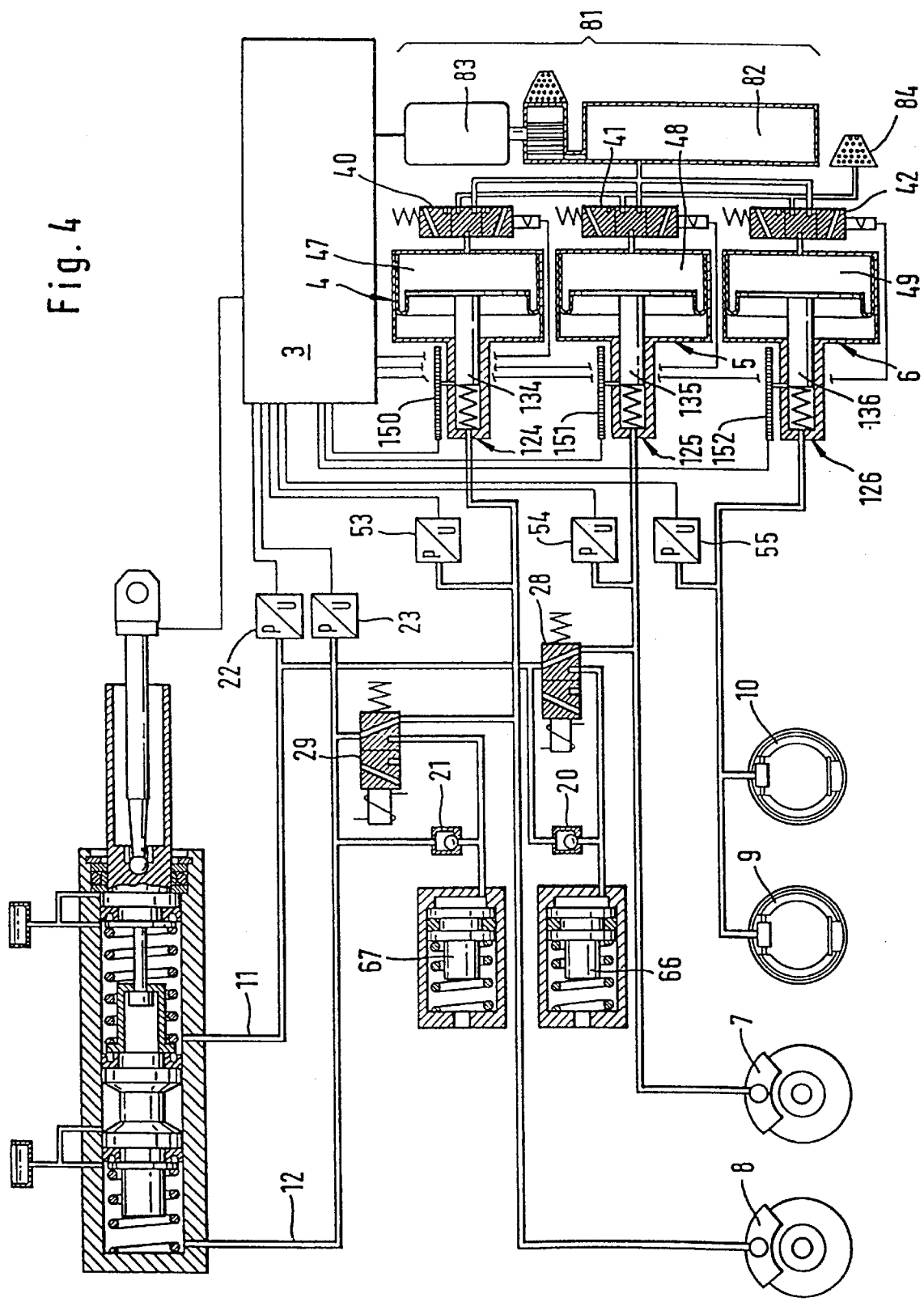
FIG. 4 is a circuit diagram of a third embodiment of the brake actuating system according to this invention.

In the third design of the invention represented in FIG. 4, the brake pressure transducers 4, 5, 6 are designed as hydraulic cylinders 124, 125, 126 whose pistons 134, 135, 136 can be actuated by means of valve-controlled, pneumatically driven linear drives 47, 48, 49. The linear drives 47, 48, 49 can be connected by means of electromagnetically driven 3/2-way valves 40, 41, 42 to a pneumatic high-pressure source 81 which is composed of a high pressure reservoir 82 and also a motor-pump system 83 charging the high-pressure reservoir 82. The 3/2-way valves 40, 41, 42 are designed preferably as pressure control valves and in their third switch setting, they disconnect the linear drives 47, 48, 49 from the high-pressure source 81 and establish their connection to the atmosphere (see air filter 84).

As is also indicated in FIG. 4, pressure sensors 53, 54, 55 are connected to the line sections leading to the wheel brakes 7 to 10; these sensors sense the pressures applied by the brake pressure transducers 4, 5, 6. At the same time, the position of the brake pressure transducer piston 134, 135, 136 is ascertained directly by means of path-voltage converters 150, 151, 152 whose output signals are supplied to the electronic control unit 3 to generate the control signals for the pressure control valves 40, 41, 42, so that they are integrated into a pressure and position control circuit. However, it is also possible to design the pneumatic pressure control valves 40, 41, 42 such that their electromagnetic actuation force counteracts the pneumatic pressure adjusted in the linear drive 47, 48, 49.

Figure 5:
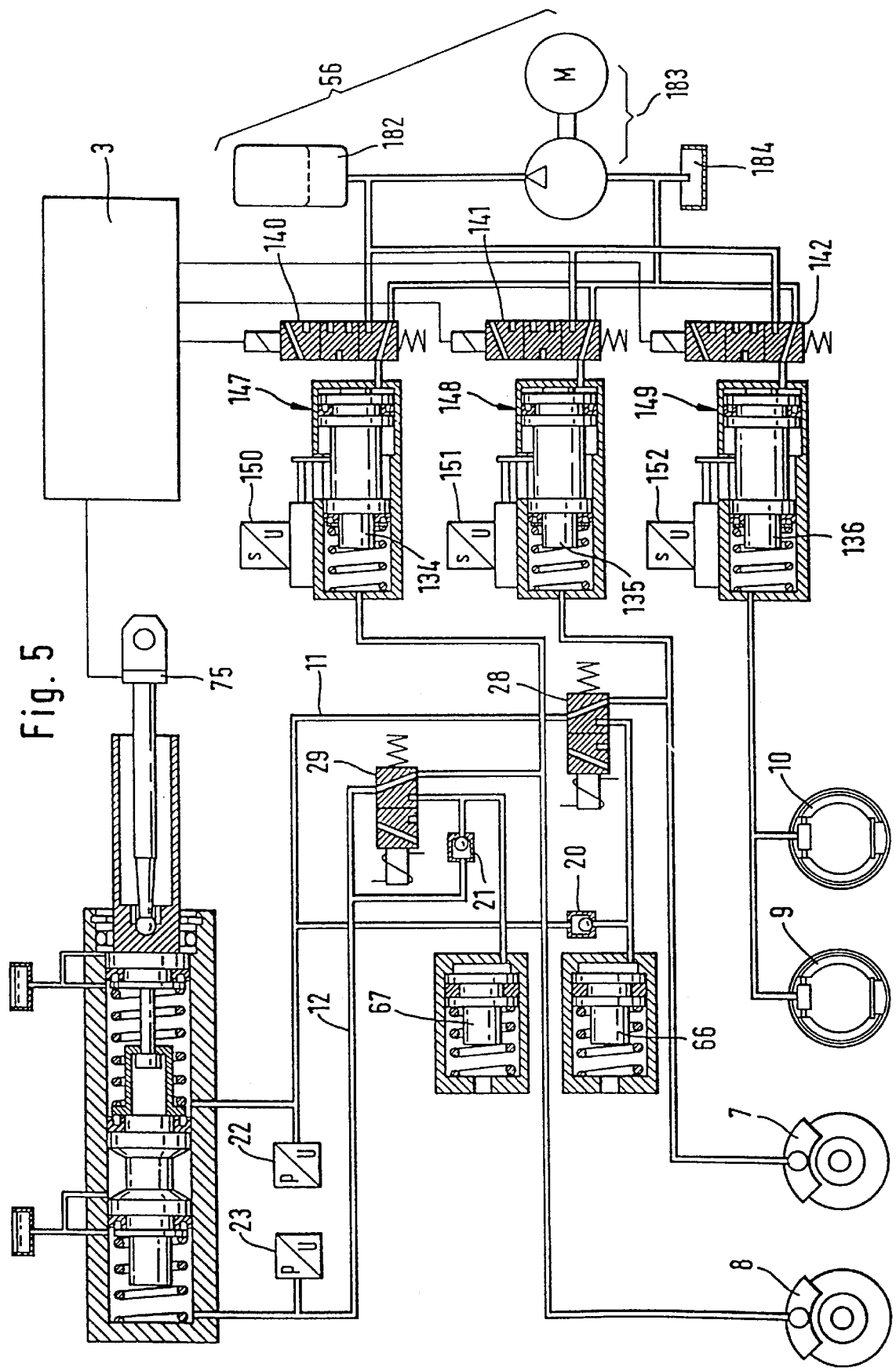
FIG. 5 is a circuit diagram of a fourth embodiment of the brake actuating system according to this invention.

Finally, FIG. 5 shows a fourth embodiment of the invented brake actuation system, in which valve-controlled, hydraulically driven linear drives 147, 148, 149 are employed to actuate the pressure transducer pistons 134, 135, 136. The driving is done by way of hydraulic 3/3-way pressure control valves 140, 141, 142 by means of a hydraulic pressure source 56 to which additional hydraulic loads present in the vehicle can be connected. The hydraulic pressure source 56 consists of a hydraulic motor-pump system 183, a depressurized hydraulic fluid supply tank 184 connected to the intake side of the pump, and also a hydraulic pressure reservoir 182 connected to the pressure side of the pump. In the first, unpowered switch setting of the control valves 140, 141, 142, there is a connection between the hydraulic linear drives 147, 148, 149 and the hydraulic fluid supply tank 184, whereas the connection between the hydraulic linear drive 147, 148, 149 and the pressure side of the pump and/or the pressure reservoir 182 is blocked. In the second switch setting, the linear drives 147, 148, 149 are disconnected both from the pressurized agent supply tank 184 and also from the pump and/or the pressure reservoir 182, so that a pressure retention phase is created. In the third switch setting, a connection of the linear drive to the pressure side of the pump or the pressure reservoir 182 is established with their simultaneous disconnection from the hydraulic fluid supply tank 184, so that a pressure buildup occurs in the wheel brakes 7 to 10. The position of the brake pressure transducer pistons 134, 135, 136 is ascertained as in the third embodiment, by means of the path-voltage converter 150, 151, 152.

Figure 6:
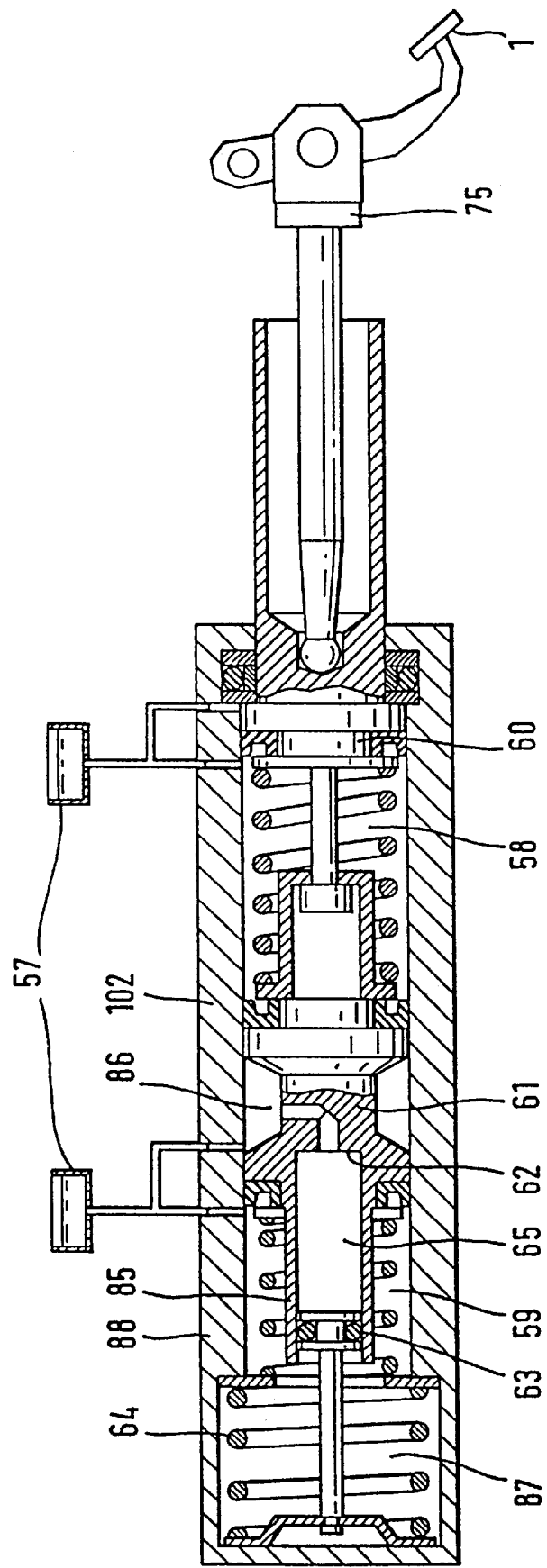
FIG. 6 is a particularly favorable embodiment of a master cylinder used in the brake actuating system according to this invention.

In the favorable embodiment of the tandem main cylinder 2 illustrated in FIG. 6, the previously mentioned simulator chamber, indicated here by reference number 87, forms a constituent of the second (secondary) pressure area 59. The simulator chamber 87 is bounded preferably by a hydraulic simulator piston 63, which is guided in an axial extension 85 of the secondary piston 61 and can be made to engage with a stop 62 formed within the secondary piston 61. The simulator piston 63 is preferably pretensioned in the actuation direction by means of a simulator spring 64 braced axially against the housing 88 of the tandem main cylinder 2, and in the secondary piston 61 it delimits a chamber 65 which is connected to an annulus 86 by means of channels (not indicated); this annulus is used as a lag space for the secondary pressure space 59 and is thus connected to the hydraulic fluid supply tank 57 associated with the tandem main cylinder 2. Upon actuation of the tandem main cylinder 2, a hydraulic differential pressure acts on the simulator piston 63 with the result that its motion is opposite the actuation direction and thus the simulator springs 64 are pressed together. The movement of the simulator piston 63 is concluded by means of the stop 62 in the secondary piston 61.

The brake actuator system illustrated in FIG. 1 operates as follows. If a brake process is initiated by pressing down the brake actuating pedal 1, then the actuation state is recognized by the brake light switch 75 and reported to the electronic control unit 3, whose control signals cause a switching of the valves 16, 17, 18, 19 and thus a disconnection of the main cylinder pressure areas 58, 59 from the brake pressure transducers 4, 5 and also their connection to the simulator chambers 14, 15. By means of the pressure sensors 22 and 23, a second report of the driver's desired deceleration occurs to the electronic control unit 3 which uses the brake force distribution installed therein to calculate the desired brake torque on the vehicle axles. The control signals corresponding to the calculated brake torques are supplied to the d-c motors 44, 45, 46 of the brake pressure transducers 4, 5, 6, which initiate a displacement of the brake pressure transducer pistons 34, 35, 36 in the actuation direction and thus a pressure increase in the wheel brakes 7 to 10. The usual, tangible pedal feel for the driver during a brake process is ensured by the now open connection between the master cylinder 2 and the simulator chambers 14, 15. The disconnect or multiplex valves 32, 33, 37, 38 inserted into the line sections leading to the wheel brakes 7 to 10 remain open.

The pressure decrease takes place by pulling back the pistons 34, 35, 36; under certain circumstances, by actively reversing the rotation of the d-c motors 44, 45, 46.

Due to the latter activity, an increase in the dynamics of the braking process is achieved. A pressure retention phase is achieved by switching the disconnect or multiplex valves 32, 33, 37, 38 into their blocked position.

An ABS control is thus carried out in three-channels (front axle two channel, rear axle single channel) in the control mode with the wheel RPM sensors 77, 78, 79, 80, while the brake pressure modulation at the rear axle being performed, for example, according to the "select-low" principle.

In the case of a traction slip control or in a drive stability control, the disconnect valves are driven in the multiplex mode. Thus, a fourth brake pressure transducer can be omitted.

In case of a failure of the electronics/vehicle electronics, all valves will go into the idle state. In this case, both of the wheel brakes 7, 8 allocated to the front axle are connected by way of the idle, open valves 16, 17 to the tandem main cylinder 2, so that the legally required regulations will be satisfied upon failure of the electronics.

After a hydraulic failure of the brake circuit allocated to the front axle, the legally required "brake by wire" brake effect can always be attained with the circuit allocated to the rear axle. Upon failure of the hydraulic circuit allocated to the rear axle, through the use of the brake light switch 75 or the pressure sensors 22, 23 it will be ensured that the brake by wire braking effect will be attained by means of the driven front axle.

What is claimed is:

1. Electronically controllable, antilock brake actuating system for a motor vehicle having vehicle wheels and wheel brakes, said system comprising:

a tandem master cylinder with a primary piston bounding a first pressure area and a secondary piston bounding a second pressure area, said tandem master cylinder being actuated by means of an actuating pedal, a hydraulic chamber provided in one of said primary and secondary pistons, a nonpressurized compressive agent supply tank cooperating with said tandem master cylinder, an electronic control unit connected to said actuating pedal, brake pressure transducers controlled by said electronic control unit, said brake pressure transducers being connected to said wheel brakes and being connectable with said tandem master cylinder by means of hydraulic linkages lockable by valve devices, at least one sensor device recognizing driver's desired deceleration and connected to said electronic control unit, at least one simulator chamber cooperating with said tandem master cylinder, said simulator chamber being bounded by a simulator piston pretensioned by means of a simulator spring, and said simulator piston being guided in and sealing said hydraulic chamber provided in one of said primary and secondary pistons, said hydraulic chamber being connected to said nonpressurized compressive agent supply tank.

2. Electronically controllable, antilock brake actuating system according to claim 1, wherein the simulator piston can move opposite the actuating direction upon actuation of the tandem master cylinder and cooperated with a stop formed in one of the tandem master cylinder pistons.

3. Electronically controllable brake actuating system according to claim 2, wherein the simulator spring is braced against the master cylinder housing.

4. Electronically controllable brake actuating system according to claim 2, wherein the simulator spring has a progressive force-path line.

5. Electronically controllable brake actuating system according to claim 1, wherein the connection between the simulator chamber and the master cylinder is blockable by means of a second valve device.

6. Electronically controllable brake actuating system according to claim 1, wherein the simulator spring biases said simulator piston in the actuating direction of the tandem master cylinder.

7. Electronically controllable, antilock brake actuating system for a motor vehicle having vehicle wheels and wheel brakes, said system comprising:

a tandem master cylinder with a primary piston bounding a first pressure area and a secondary piston bounding a second pressure area, said tandem master cylinder further including at least one simulator chamber adjacent said secondary pressure area, said simulator chamber being bounded by a simulator piston pretensioned by means of a simulator spring, said tandem master cylinder being actuated by means of an actuating pedal, a hydraulic chamber provided in said secondary piston, a nonpressurized compressive agent supply tank cooperating with said tandem master cylinder, an electronic control unit connected to said actuating pedal, brake pressure transducers controlled by said electronic control unit, said brake pressure transducers being connected to said wheel brakes and being connectable with said tandem master cylinder by means of hydraulic linkages lockable by valve devices, at least one sensor device recognizing driver's desired deceleration and connected to said electronic control unit, and said simulator piston being guided in and sealing said hydraulic chamber provided in said secondary piston against compressive agent flow in an actuation direction of said primary and secondary pistons, said hydraulic chamber being connected to said nonpressurized compressive agent supply tank.

8. Electronically controllable, antilock brake actuating system according to claim 7, wherein the simulator piston can move opposite the actuating direction upon actuation of the master tandem cylinder and cooperated with a stop formed on said secondary master cylinder piston.

9. Electronically controllable brake actuating system according to claim 8, wherein the simulator spring is braced against the master cylinder housing.

10. Electronically controllable brake actuating system according to claim 8, wherein the simulator spring has a progressive force-path line.

11. Electronically controllable brake actuating system according to claim 7, wherein the connection between the simulator chamber and the master cylinder is blockable by means of a second valve device.

12. Electronically controllable brake actuating system according to claim 7, wherein the simulator spring biases said simulator piston in said actuating direction of the tandem master cylinder.

* * * * *